United States Patent
Van De Sluis et al.

(10) Patent No.: US 11,716,798 B2
(45) Date of Patent: Aug. 1, 2023

(54) CONTROLLER FOR CONTROLLING LIGHT SOURCES AND A METHOD THEREOF

(71) Applicant: SIGNIFY HOLDING B.V., Eindhoven (NL)

(72) Inventors: Bartel Marinus Van De Sluis, Eindhoven (NL); Berent Willem Meerbeek, Veldhoven (NL); Marcellinus Petrus Carolus Michael Krijn, Eindhoven (NL); Leendert Teunis Rozendaal, Valkenswaard (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 138 days.

(21) Appl. No.: 17/430,802

(22) PCT Filed: Feb. 10, 2020

(86) PCT No.: PCT/EP2020/053279
§ 371 (c)(1),
(2) Date: Aug. 13, 2021

(87) PCT Pub. No.: WO2020/169382
PCT Pub. Date: Aug. 27, 2020

(65) Prior Publication Data
US 2022/0151039 A1    May 12, 2022

(30) Foreign Application Priority Data
Feb. 18, 2019   (EP) ..................................... 19157613

(51) Int. Cl.
*H05B 45/22* (2020.01)
*H05B 47/105* (2020.01)
(Continued)

(52) U.S. Cl.
CPC ............. *H05B 45/22* (2020.01); *H05B 45/20* (2020.01); *H05B 47/105* (2020.01); *H05B 47/125* (2020.01)

(58) Field of Classification Search
CPC .......... G06T 7/73; H05B 45/20; H05B 45/22; H05B 47/105; H05B 47/125; H05B 47/19; Y02B 20/40
See application file for complete search history.

(56) References Cited

U.S. PATENT DOCUMENTS

| 2012/0081012 | A1 | 4/2012 | Van De Sluis et al. |
| 2015/0110355 | A1 | 4/2015 | Dill |

(Continued)

FOREIGN PATENT DOCUMENTS

| CN | 104144353 A | 11/2014 | |
| EP | 3177113 A1 * | 6/2017 | ................ G01J 1/42 |

(Continued)

*Primary Examiner* — Raymond R Chai

(57) ABSTRACT

A controller and a method for controlling at least two light sources is disclosed. The method 700 comprises: obtaining 702 an image captured with a camera, wherein the image comprises at the least two light sources and at least two objects, analyzing 704 the image to detect the at least two light sources and the at least two objects in the image, identifying 706 the at least two light sources, determining 708 positions of the at least two objects relative to the at least two light sources in the image, obtaining 710 color information related to colors of the at least two objects, determining 712 a first color for a first light source of the at least two light sources and a second color for a second light source of the at least two light sources based on the color information and based on the determined relative positions and controlling 714 the first light source according to the first color and the second light source according to the second color, wherein the image comprises a third light source, and the method further comprises determining a (Continued)

third color for the third light source based on the first color and/or the second color, and controlling the third light source according to the third color.

14 Claims, 7 Drawing Sheets

(51) Int. Cl.
  *H05B 45/20* (2020.01)
  *H05B 47/125* (2020.01)

(56) References Cited

U.S. PATENT DOCUMENTS

| | | | |
|---|---|---|---|
| 2016/0081164 A1* | 3/2016 | De Bruijn | H05B 47/155 |
| | | | 315/149 |
| 2016/0098609 A1 | 4/2016 | Gritti et al. | |
| 2017/0265279 A1 | 9/2017 | Chraibi et al. | |
| 2018/0279440 A1* | 9/2018 | Van De Sluis | H05B 45/20 |
| 2018/0324921 A1* | 11/2018 | Aliakseyeu | H05B 45/20 |
| 2019/0057274 A1* | 2/2019 | Inaba | G06F 18/217 |

FOREIGN PATENT DOCUMENTS

| | | | | |
|---|---|---|---|---|
| WO | 2017174412 A1 | 10/2017 | | |
| WO | WO-2017174551 A1 * | 10/2017 | ......... | H05B 33/0863 |
| WO | 2018050590 A1 | 3/2018 | | |
| WO | WO-2018050590 A1 * | 3/2018 | ......... | H05B 37/0227 |

* cited by examiner

CONTROLLER FOR CONTROLLING LIGHT SOURCES AND A METHOD THEREOF

CROSS-REFERENCE TO PRIOR APPLICATIONS

This application is the U.S. National Phase application under 35 U.S.C. § 371 of International Application No. PCT/EP2020/053279, filed on Feb. 10, 2020, which claims the benefit of European Patent Application No. 19157613.1, filed on Feb. 18, 2019. These applications are hereby incorporated by reference herein.

FIELD OF THE INVENTION

The invention relates to a method of controlling at least two light sources, and to a computer program product for executing the method. The invention further relates to a controller for controlling at least two light sources.

BACKGROUND

Home and office lighting control systems enable users to control lamps that are distributed throughout the space. A user can select a lamp, for instance by selecting it on a user interface of a mobile device such as a smartphone, and provide a user input to change the light output (e.g. intensity, color, etc.) of the lamp.

WO 2018050590 A1 discloses a lighting control system for controlling a plurality of lighting units wherein an image of a space including the lighting units is obtained, and certain non-lighting objects in the space are identified. The objects can be associated with light settings, and the relative position of lighting units to the objects allows the lighting units to be selectively associated with those light settings. Examples of non-lighting objects which can be identified in various embodiments include: a television, a monitor, a games console, a speaker, a chair, a table, a desk, or a window. In one example the non-lighting object will have a setting, or control logic or parameters associated with it, and luminaires will be indirectly linked, via proximity based association with that object.

SUMMARY OF THE INVENTION

The inventors have realized that it may be desirable to control light sources according to certain colors, such that the colors emitted by the light sources complement the interior of a user's home, or that the light sources complement colors of other light sources. In order to achieve this with existing systems, the user can manually select the colors for the light sources via a user interface of a mobile device such that they match the user's interior or colors of other light sources. This may be a cumbersome task, especially when the colors in a room or the colors of objects change frequently. It is therefore an object of the present invention to provide a method and a controller for automatically controlling light sources such that their light output complements other objects.

According to a first aspect of the present invention, the object is achieved by a method of controlling at least two light sources, the method comprising:

obtaining an image captured with a camera, wherein the image comprises at the least two light sources and at least two objects, analyzing the image to detect the at least two light sources and the at least two objects in the image, identifying the at least two light sources, determining positions of the at least two objects relative to the at least two light sources in the image, obtaining color information related to colors of the at least two objects, determining a first color for a first light source of the at least two light sources and a second color for a second light source of the at least two light sources based on the color information and based on the determined relative positions and controlling the first light source according to the first color and the second light source according to the second color.

The image comprises the at least two light sources and the at least two objects. By determining the positions of the objects relative to the light sources in the image, associations between each of the objects and each of the light sources can be created. After the associations have been made based on the relative positions, the light sources are controlled based on the colors of the respective associated objects. As a result, the light sources are controlled such they complement the colors of the objects. The objects may be part of a user's interior (e.g. furniture, pieces of art, other light sources, etc.), and the colors emitted by the light sources thereby complement/match other colors in the room.

The image may further comprise a third light source, and wherein the method may further comprise:

determining a third color for the third light source based on the first color and/or the second color, and controlling the third light source according to the third color. This is beneficial, because the third light source may be controlled without requiring another (third) object in the image.

The third color may be determined based on a position of the third light source in the image relative to positions of the first and second light sources in the image. The third color may be dependent on a difference between a first distance between the third light source and the first light source and a second distance between the third light source and the second light source. This is beneficial, because the color of the light emitted by the third light source may for example be determined such that the color of the third light source complements the color of a light source that is located closest to the third light source.

The third color may be determined by interpolating between the first and the second color, or by extrapolating the first and the second color. If the third light source is located between the first and the second light source, it may be controlled according to a color that is determined by interpolating between the first and the second color. If the third light source is not located in between (but outside) the first and the second light source, it may be controlled according to a color that is determined by extrapolating between the first and the second color. This is beneficial, because the first, second and third light source may create a gradient light effect. While interpolating or extrapolating, the position of the third light source relative to the first and second light sources in the image may be further taken into account to determine the third color. This provides an improved gradient light effect.

The method may further comprise: determining distances between the at least two objects and the at least two light sources in the image. The step of determining the first color for the first light source and the second color for the second light source may be further based on the distances. The step of determining the first and second color may be executed such that the sum of the distances between the objects is minimized. As a result, the light source closest to the first object is associated with the first object, and light source closest to the second object is associated with the second object.

The method may further comprise: obtaining information indicative of light rendering properties of the at least two light sources, and the step of determining the first color for the first light source and the second color for the second light source may be further based on the light rendering properties of the at least two light sources. If, for example, a light source is unable to render a certain color of an object, and another light source can render that color, the other light source may be associated with the object and controlled according to the objects color.

The method may further comprise: rendering the image on an image rendering device. This is beneficial, because it enables a user to see the image that has been captured. Additionally, an indicator indicating the associations between objects and light sources may be rendered on the image rendering device.

The method may further comprise the step receiving, via a user interface, a user input indicative of a selection of the first object and/or the second object in the image. In embodiments wherein several (e.g. three or more) objects are present in the image, the user may select which of the objects is to be associated with one of the light sources by providing the user input.

The method may further comprise the steps of receiving a lighting adjustment user input, and adjusting the light output of the first and/or the second light source based on the lighting adjustment user input. This is beneficial because it enables a user to adjust the light output of the light sources after the association has been made.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for controlling at least two light sources, the controller comprising:

a transmitter configured to transmit lighting control commands to the at least two light sources, a receiver configured to receive an image captured with a camera, wherein the image comprises the at least two light sources and at least two objects, a processor configured to analyze the image to detect the at least two light sources and the at least two objects, identify the at least two light sources, determine positions of the at least two objects relative to the at least two light sources in the image, obtain color information related to colors of the at least two objects, determining a first color for a first light source of the at least two light sources and a second color for a second light source of the at least two light sources based on the color information and based on the determined relative positions, and control the first light source according to the first color and the second light source according to the second color via the transmitter.

In the context of the present invention the term "color information" and "color" of the objects may relate to the hue, saturation and/or brightness of the objects. The colors of the objects may be static, or change over time, for instance when the objects are other light sources.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
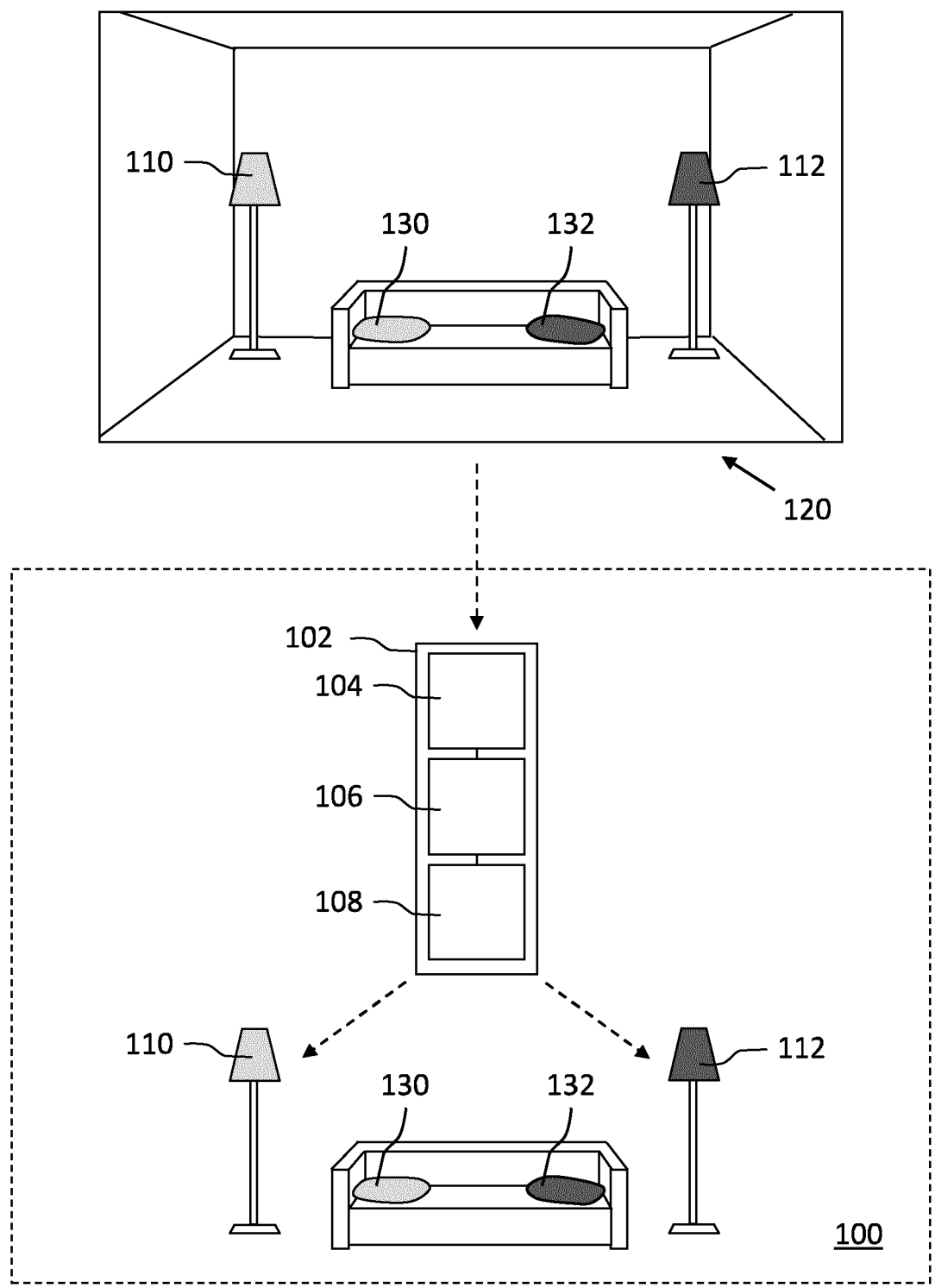
FIG. 1 shows schematically an embodiment of a (home) lighting system comprising a controller for controlling two light sources, and an image of the light sources.

FIG. 1 shows schematically an embodiment of a (home) lighting system 100 comprising a controller 102 for controlling light sources 110, 112. FIG. 1 further shows an image 120 of the light sources 110 and 112, which correspond to light sources 110 and 112, respectively, in the system 100. The image 120 further comprises two objects 130 and 132, which correspond to the objects 130, 132 in the system 100. The objects 130, 132 are exemplary illustrated as pillows on a couch.

The controller 102 comprises a transmitter 108 configured to transmit lighting control commands to the light sources 110, 112. The controller 102 further comprises a receiver 104 configured to receive an image 120 captured with a camera, wherein the image 120 comprises the light sources 110, 112 and the objects 130, 132. The controller 102 further comprises a processor 106 (e.g. a microcontroller, circuitry, etc.). The processor 106 may be configured to analyze the image 120 to detect the light sources 110, 112 and the at least two objects 130, 132 in the image 120. The processor 106 may be further configured to identify the light sources 110, 112. The processor 106 may be further configured to determine positions of the objects 130, 132 relative to the light sources 110, 112 in the image 120, and to determine a first color for a first light source 110 of the at least two light sources 110, 112 and a second color for a second light source 112 of the at least two light sources 110, 112 based on the color information and based on the determined relative positions. The processor 106 may be further configured to obtain color information related to colors of the at least two objects 130, 132, for example by extracting a first color (indicated as light grey in FIG. 1) of the first object 130 and a second color (indicated as dark grey in FIG. 1) of the second object 132 from the image 120. Additionally or alternatively, the processor 106 may be configured to receive the color information, for example via the receiver 104, from the objects 130, 132 (which may be other light sources) or from a further device (e.g. a central control system). The processor 106 is further configured to control the first light source 110 according to the first color (indicated as light grey in FIG. 1) and the second light source 112 according to the second color (indicated as dark grey in FIG. 1) via the transmitter 108.

The controller 102 may be any device configured to control the light sources 110, 112. In a first example, the controller 102 may be comprised in a device (e.g. a smartphone, a tablet pc, a wearable device such as smartglasses, etc.) that comprises a camera for capturing the image 120. In this example, the receiver 104 may be an input for the processor 106. In a second example, the processor may be comprised in a separate device (e.g. a bridge, a router, a central (home/office) control system, a smartphone, a remote server connectable via the internet, etc.) configured to receive the image from a remote camera device (e.g. a smartphone, a security camera, a hand-held camera, etc.). In this example, the receiver 104 may be configured to receive the image 120 from the camera device directly or indirectly via a network.

The controller 102 comprises the transmitter 108 configured to transmit lighting control commands to the light sources 110, 112. The lighting control commands may be transmitted to the light sources 110, 112 directly or indirectly (e.g. via a bridge, a router, a central (home/office) control system, etc.). The transmitter 102 may be a transceiver. The lighting control commands may comprise lighting control instructions for the light sources 110, 112 to control their light output according to light settings, e.g. colors. The transmitter 108 may comprise hardware for transmitting the lighting control commands via any wired or wireless communication protocol to the light sources 110, 112. Various wired and wireless communication protocols may be used, for example Ethernet, DMX, DALI, USB, Bluetooth, Wi-Fi, Li-Fi, 3G, 4G, 5G or Zigbee.

The controller 102 further comprises the receiver 104 configured to receive the image 120. The controller 102 may comprise a transceiver comprising both the transmitter 108 and the receiver 104. In embodiments wherein the controller 102 comprises the camera for capturing the image 120, the receiver 104 may be an input of the processor 106, and the processor 106 may receive the image 120 from the camera via the input.

The processor 106 may be configured to analyze the image 120 to detect (identify and/or recognize) the light sources 110, 112 and the objects 130, 132 in the image. Image analysis techniques for analyzing images to recognize objects are known to the person skilled in the art and will therefore not be discussed in detail. The processor 106 may be configured to recognize and select objects in the image 120 based on object properties (e.g. object size, object type, object shape, object color, etc.). The processor 106 may, for example, be configured to detect and select objects 130, 132 in the image 120 which have high contrasting colors or different colors relative to other objects/surfaces/surroundings in the image 120. Additionally or alternatively, the processor 106 may be configured to detect and select objects 130, 132 in the image 120 based on the recognized (type of) object. The processor 106 may, for example, ignore walls, surfaces, etc. of the building infrastructure, and select objects not part of the building infrastructure. In the example of FIG. 1, the processor 106 may for example, ignore the couch (which may have a color similar to the color of the wall), and select the pillows 130, 132 on the couch based on their object properties (e.g. because of the type of object, or because of the color of the object).

In embodiments, the processor 106 may be configured to communicate the image 120 to, for example, a remote server, and a second processor of the remote server may analyze the image 120 and communicate data indicative of the light sources 110, 112 and the objects 130, 132 in the image 120 to the controller 102.

The processor 106 may be further configured to identify the light sources 110, 112. The processor 106 may be configured to identify the light sources 110, 112 by performing image analysis on the image 120, and to recognize the light sources 110, 112 in the image 120. For example, the processor 106 may be configured to identify the light sources by detecting one or more codes comprised in the light emitted by the light source. The one or more codes may be extracted from a plurality of images 120. Coded light extraction from images is known in the art, and will therefore be not discussed in detail. Additionally or alternatively, the processor 106 may recognize the light sources 110, 112 in the image 120 using object recognition to recognize and identify the light sources 110, 112 in the image 120. The light sources 110, 112 captured in the image 120 may, for example, have a predefined shape and/or be set to a (predefined) light setting, and the processor 106 may be configured to recognize the shape and/or the (predefined) light setting to recognize and therewith identify the light sources. In embodiments, the processor 106 may be configured to communicate the image 120 to, for example, a remote server, and a second processor of the remote server may analyze the image 120 to identify the light sources 110, 112 the image 120, and communicate data indicative thereof back to the processor 106 of the controller 102.

Alternatively or additionally, for example in embodiments wherein the controller 102 is comprised in a camera device comprising the camera, the processor 106 may be configured to identify the light sources 110, 112 based on a spatial location and an orientation of the camera device and at least one spatial location of the light sources 110, 112. If the camera is incorporated into a mobile device, the spatial location and orientation of the mobile device may be used as spatial location and orientation of the camera. Spatial locations of light sources 110, 112 may be received via wireless signals, for example.

The processor 106 may be further configured to determine positions of the objects 130, 132 relative to the light sources 110, 112 in the image 120. The processor 106 may be configured to analyze the image to 120 determine the relative positions. The relative positions may be determined by applying image analysis techniques, which are known in the art. In embodiments, the processor 106 may be configured to communicate the image 120 to, for example, a remote server, and a second processor of the remote server may analyze the image 120 to determine positions of the objects 130, 132 relative to the light sources 110, 112 in the image 120, and communicate data indicative thereof back to the processor 106 of the controller 102.

In the examples of FIGS. 1-6, a two-dimensional image is used to determine the positions of the at least two objects relative to the at least two light sources in the image. It should be understood that three-dimensional images (e.g. 3D depth images, (panoramic) 3D room scans, etc.) may also be used to determine the positions of the at least two objects relative to the at least two light sources in the image. Various techniques for determining relative positions of devices and/or objects in three-dimensional images are known in the art (e.g. 3D single-object recognition techniques), and will therefore not be discussed in detail.

Figure 4:
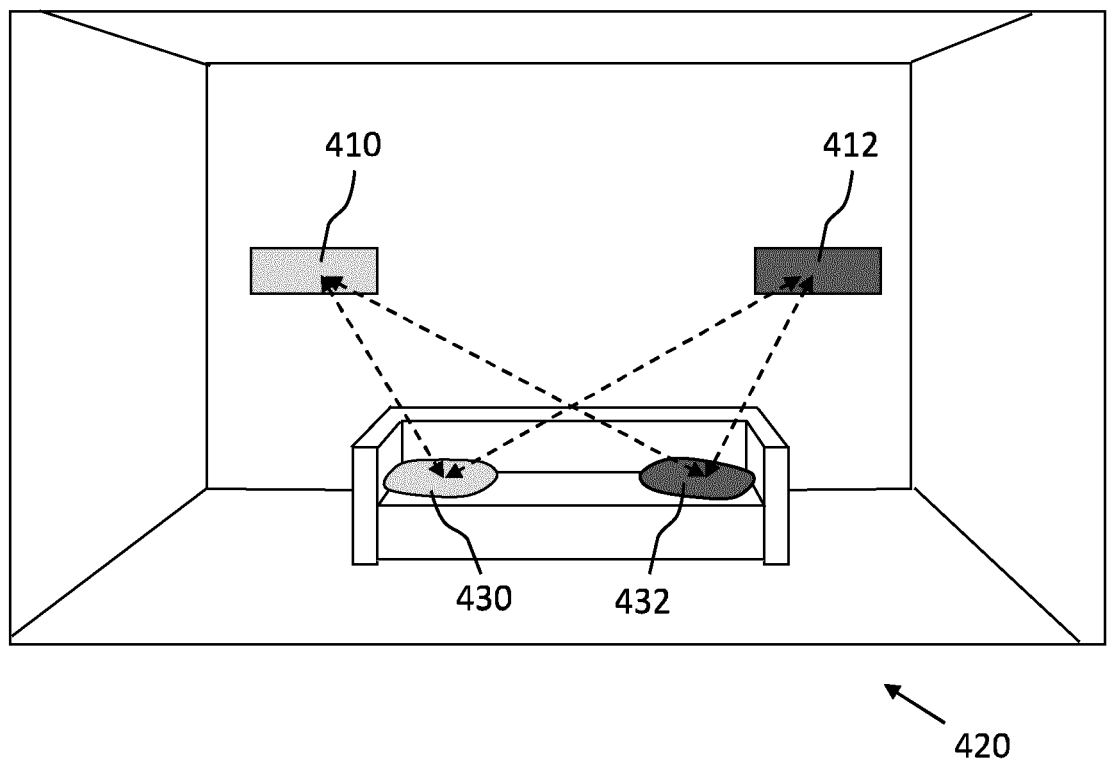
FIG. 4 shows schematically a captured image comprising two light sources and two objects, and dotted lines indicating distances between the objects and the light sources.

The processor 106 may be further configured to determine a first color for a first light source 110 of the at least two light sources and a second color for a second light source 112 of the at least two light sources based on the color information and based on the determined relative positions. The processor 106 may, for example, be configured to associate a first object 130 with a first light source 110 and a second object 132 with a second light source 112 based on the determined relative positions. The processor 106 may, for example, be configured to determine distances between the objects 130, 132 and the light sources 110, 112 in the image 120. The processor 106 may be further configured to associate the first object 130 with the first light source 110 and the second object 132 with the second light source 112 further based on the distances. The processor 106 may, for example, associate the first object 130 with the first light source 110 and the second object 132 with the second light source 112 such that the sum of the distances is minimized. FIG. 4 illustrates an example of a captured image 420 wherein distances (depicted as dotted lines) between objects 430, 432 and light sources 410, 412 are determined in the image 420. These distances indicate that a first object 430 is located closest to light source 410, and that a second object 432 is located closest to a second light source 412. Based on these distances, the processor (not shown in FIG. 4) may associate the first object 430 with the first light source 410 and the second object 432 with the second light source 412. Alternatively, the processor 106 may, for example, associate the first object 130 with the second light source 112 and the second object 132 with the first light source 110 such that the sum of the distances is maximized. This may result in a more dynamic overall ambiance in the space, while the light output of the light sources 110, 112 still matches the colors of the objects 130, 132 (and therewith the users interior).

The processor 106 is further configured to obtain color information related to colors of the at least two objects 130, 132. The processor 106 may, for example, be configured to obtain the color information by extracting the color information from the image 120. The processor 106 may, for example, extract a first color (for example yellow, indicated as light grey in FIG. 1) of the first object 130 (e.g. the left pillow on the couch in FIG. 1) and a second color (e.g. red, indicated as dark grey in FIG. 1) of the second object 132 (for example the right pillow on the couch in FIG. 1) from the image 120. In embodiments, the processor 106 may be configured to communicate the image 120 to, for example, a remote server, and a second processor of the remote server may analyze the image 120 to extract the first color of the first object 130 and the second color of the second object 132 from the image 120, and communicate data indicative thereof back to the processor 106 of the controller 102. The processor 106 (or the second remote processor) may execute this step while analyzing the image 120. The processor 106 may control the first light source 110 according to the first color (e.g. yellow, indicated as light grey in FIG. 1) and the second light source 112 according to the second color (e.g. red, indicated as dark grey in FIG. 1) by sending control commands to the light sources 110, 112 via the transmitter 108.

Additionally or alternatively, the processor 106 may be configured to receive the color information from the objects 130, 132 (either directly or indirectly). The objects 130, 132 may, for example, be lighting devices (see FIG. 6c, which is further discussed below) configured to transmit information indicative of current colors of the light emitted by the lighting devices. Alternatively, the color information of the lighting devices may be received from a central (home) control system, from a bridge, from a (remote) server, a lighting control system, etc. Alternatively, the color information of the lighting devices may be stored on a memory comprised in the controller 102, which may be accessible by the processor 106. It should be understood that lighting devices are merely examples of objects of which the color information may be received, and that the skilled person is able to conceive alternative objects (such as other types of devices) of which the color information may be received.

Figure 2:
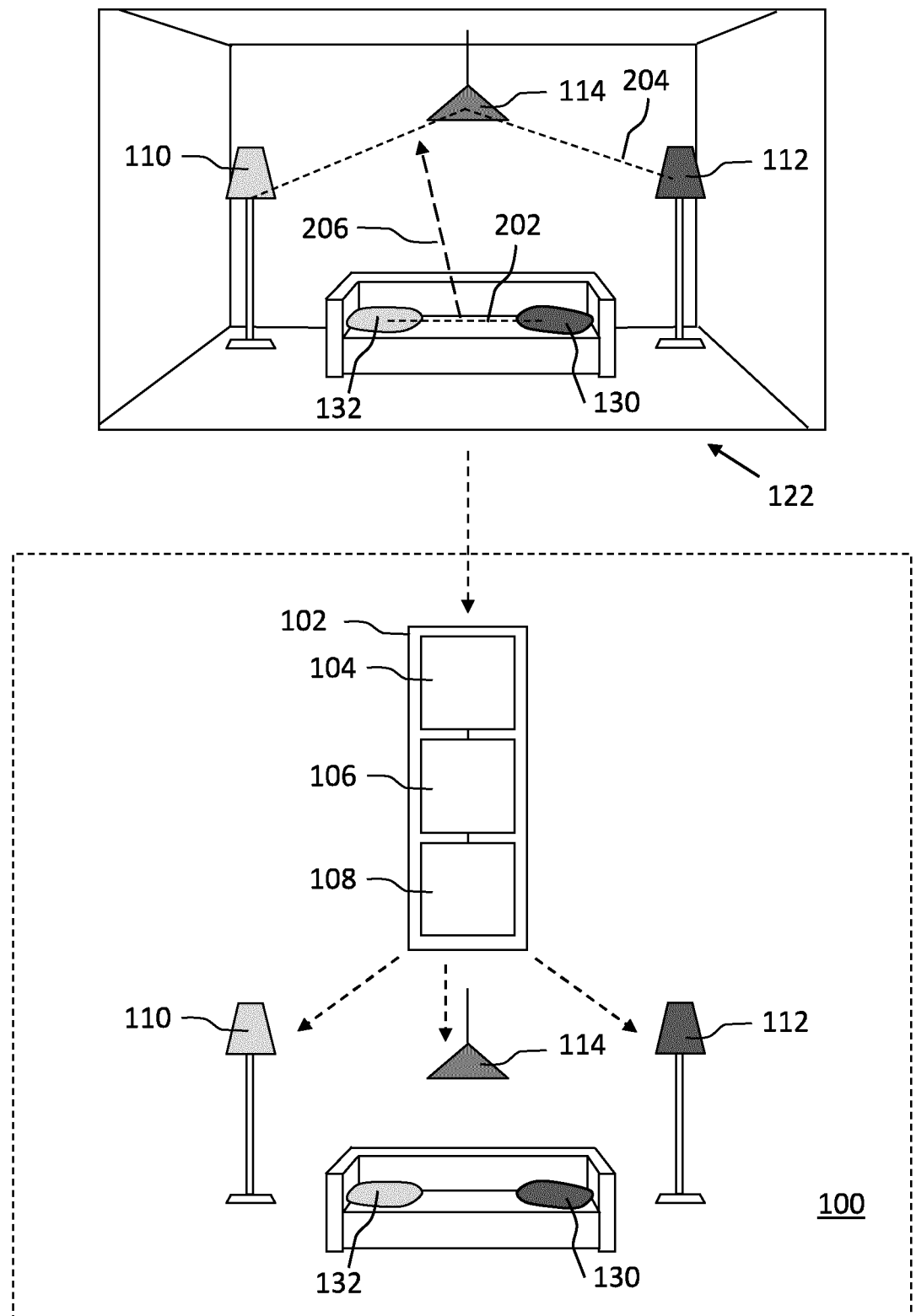
FIG. 2 shows schematically an embodiment of the lighting system of FIG. 1, comprising an additional light source.

FIG. 2 shows schematically an embodiment of the lighting system 100 of FIG. 1, comprising an additional light source 114. It may occur that less (relevant) objects are detected in the image 122. This may be due to that the processor 106 may be configured to select the objects based on (predefined) object properties. In the example of FIG. 2, two (relevant) objects 130, 132 have been detected in the image 120, while the system 100 of FIG. 2 comprises three light sources 110, 112, 114. If the number of detected objects is lower than the number of detected light sources 110, 112, 114, the processor 106 may be configured to determine the spatial arrangement of the light sources 110, 112, 114 in the image 122 by analyzing the image 122, and determine the spatial arrangement of the objects 130, 132 in the image 122 by analyzing the image 122. The processor 106 (or a second remote processor) may be further configured to analyze the image 122 to determine the position of the third light source 114 in the image relative to the other light sources 110 and 112. The processor 106 may be configured to map 206 the spatial arrangement 202 of the objects 130, 132 onto the spatial arrangement 204 of the light sources 110, 112, 114 (or vice versa). The processor 106 may be further configured to determine a third color (e.g. orange, referring to the example mentioned above, indicated as medium grey in FIG. 2) for the third light source 114 based on the first color and/or the second color, and control the third light source 114 according to the third color.

Figure 3A:
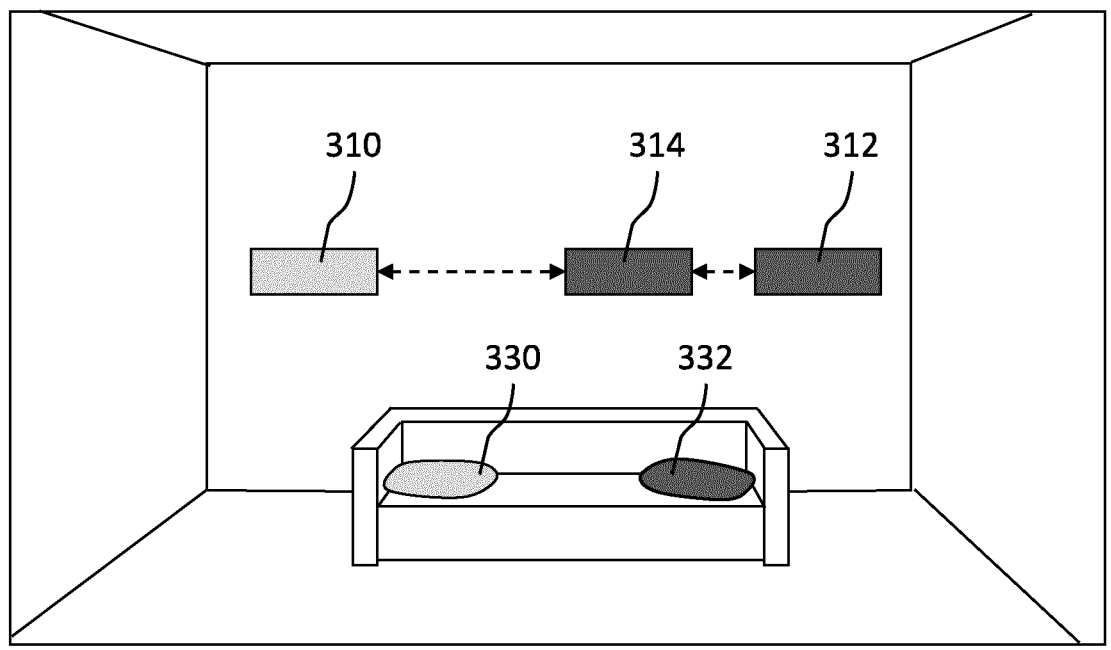
FIGS. 3a and 3b show schematically captured images comprising three light sources.
Figure 3B:
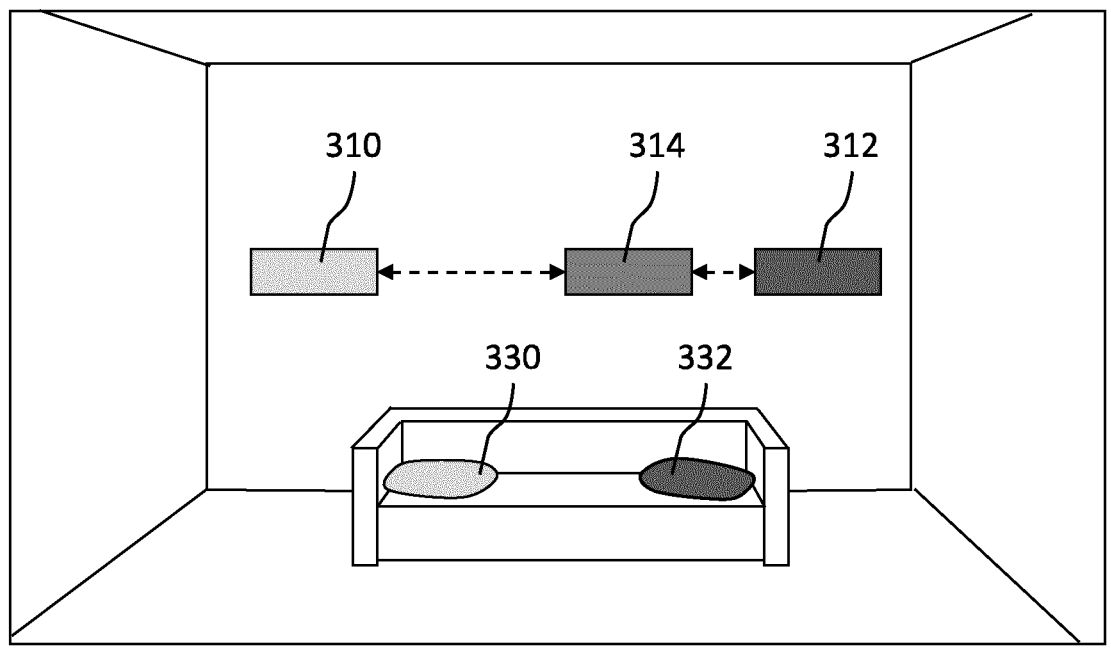

The processor 106 may, for example, determine the third color based on the position of the third light source 114 in the image 122 relative to positions of the first light source 110 and second light source 112 in the image 122. This is further illustrated in FIGS. 3a and 3b. These FIGS. illustrate rooms comprising a lighting system comprising a first light source 310 (e.g. a first lighting panel), a second light source 312 (e.g. a second lighting panel) and a third light source 314 (e.g. a third lighting panel). The processor (not shown) may have associated a first object 330 with the first light source 310, and a second object 332 with the second light source 312, and control these light sources according to the first color of the first object 330 and the second color of the second object 332, respectively. The processor may further determine a third color based on the position of the third light source 314 in the image relative to positions of the first light source 310 and second light source 312 in the image. The processor 106 may be further configured to determine the third color dependent on a difference between a first distance (indicated as the left arrow in FIGS. 3a and 3b) between the third light source 314 and the first light source 310 and a second distance (indicated as the right arrow in FIGS. 3a and 3b) between the third light source 314 and the second light source 312. The processor 106 may, for example, select the third color such that it matches the color of the light source located closest to the third light source 314. This is illustrated in FIG. 3a, wherein the third color has been selected to be similar to the second color, because the third light source 314 is located closest to the second light source 312. Additionally or alternatively, the processor 106 may be configured to determine the third color by interpolating between the first and the second color. The processor 106 may further determine the third color based on the third color based on the position of the third light source 314 in the image relative to positions of the first light source 310 and second light source 312. This is illustrated in FIG. 3b, wherein the third color has been selected by interpolating between the first color of the first light source 310 (and therewith the color of the first object 330) and the second color of the second light source 312 (and therewith the color of the first object 332). In the example of FIG. 2, the third light source 114 is located between the first light source 110 and the second light source 112. It may occur that the light source is located outside (not between) the first light source 110 and the second light source 112. In such a case, the processor 106 may be configured to extrapolate the first and the second color to generate the third color, based on the position of the third light source relative to the first and second light sources. If, referring to the example mentioned above wherein the first color is yellow and the second color is red, the third lighting device would be located to the right of the second lighting device 112 in the image 122, the processor 106 may extrapolate the yellow and the red color according to an extrapolation rule, for example another more saturated red color. Interpolation and extrapolation of colors for controlling light sources is known in the art, and will therefore not be discussed in detail.

The light sources 110, 112 may be light sources of individual lighting devices (luminaires). Alternatively, the light sources 110, 112 may be light sources 110, 112 comprised in a single lighting device, for example in and LED array such as an LED strip, in a light panel, a TLED, etc. The light sources in the single lighting device may be individually controllable. The light sources 110, 112 may be LED light sources. The light sources may comprise one or more control units, such as a microcontroller (not shown), for controlling the light output generated by the light sources based on lighting control commands received from the processor 106 of the controller 102. A lighting control command may comprise lighting control settings for controlling the light output. The lighting control settings may relate to light properties such as the color, intensity, saturation, beam size, beam shape, etc. according to which the light sources 110, 112 are to be controlled. The lighting control settings may be indicative of a dynamic light scene, wherein one or more light properties change over time. The light sources 110, 112 may be different type of light sources, each having different light rendering properties. The light rendering properties may relate to the color, intensity, saturation, etc. of the light that can be emitted by a respective light source.

The processor 106 may be further configured to obtain information indicative of light rendering properties of the light sources 110, 112. The processor 106 may receive this information via the receiver 104, for instance directly from the light sources 110, 112, or from another device such as a bridge, a router, a central (home/office) control system, an external server, a lighting control system, etc. The processor 106 may be further configured to associate the first object 130 with the first light source 110 and the second object 132 with the second light source 112 based on the light rendering properties of these light sources 110, 112. If, for example, the first light source 110 is a tunable white light source configured to render white light at different temperatures (e.g. from 2200K to 6500K) and the second light source 120 is a color light source configured to render colored light, the processor 106 may (referring to the above-mentioned example) associate the first light source 110 with the first (yellow-colored) object 130 and the second light source 112 with the second (red-colored) object 132 based on the light rendering properties of the light sources 110, 112.

Figure 5A:
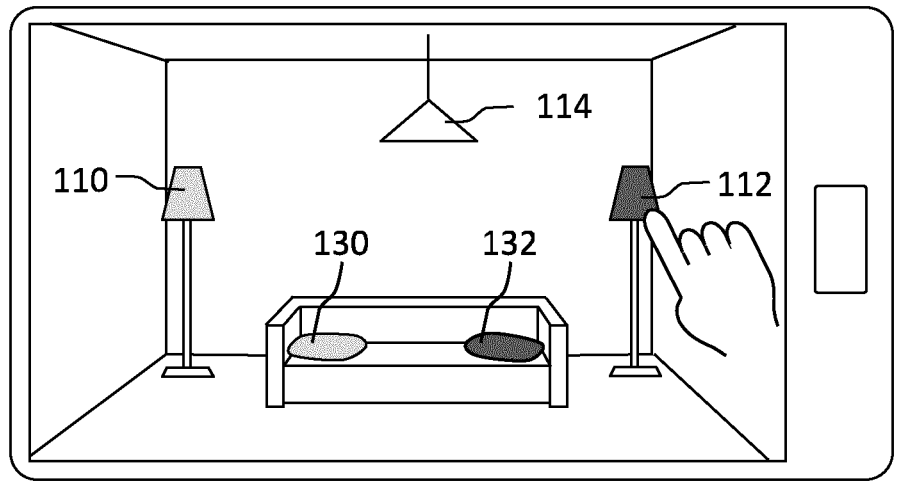
FIGS. 5a, 5b and 5c show schematically embodiments of user inputs at a touch display of an image rendering device.
Figure 5B:
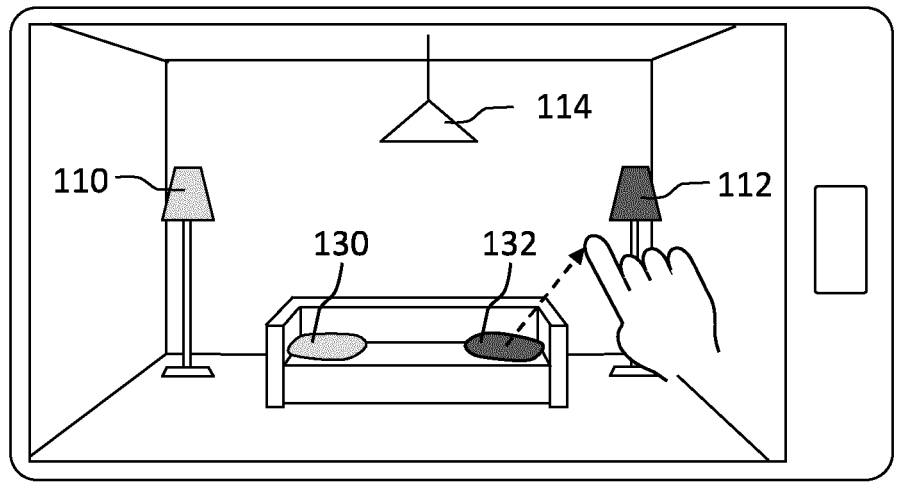
Figure 5C:
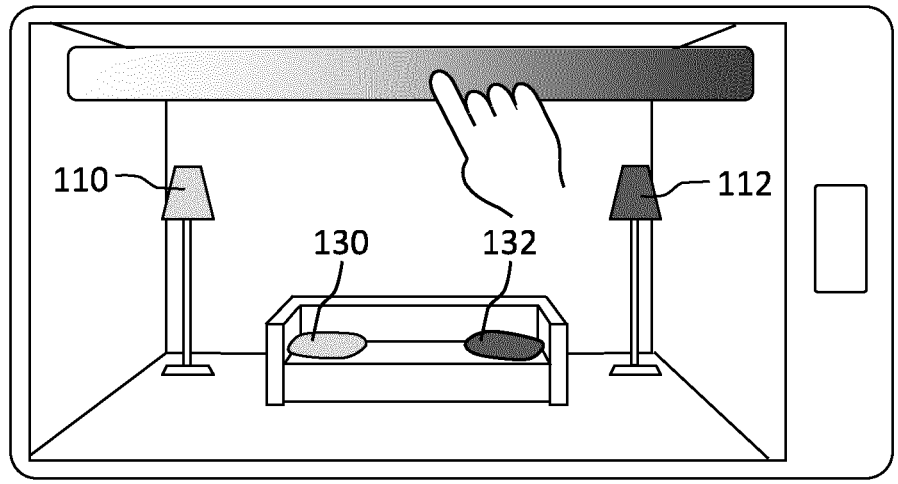

The processor 106 may be further configured to render the captured image 120 on an image rendering device (e.g. a display, a projector). The processor 106 may be comprised in a device comprising the image rendering device. The device may further comprise a camera for capturing the image 120, which may be rendered on the image rendering device. FIGS. 5a-5c illustrate examples of mobile devices (e.g. smartphones). In these examples, the image 122 of FIG. 2 is rendered on a display of the mobile device.

The processor 106 may be further configured to receive, via a user interface, a user input indicative of a selection of the first object 130 and/or the second object 132 in the image 120. This may be beneficial if the image 120 comprises more than two objects. The processor 106 may be further configured to indicate to a user, via the image rendering device, which objects have been detected in the image 120, enabling a user to select a certain object for a certain light source. The processor 106 may, for example, highlight or attenuate the selected objects on the image rendering device. Alternatively, the user may select an area or a point in the image 120, whereupon the processor 106 (or the second remote processor) may analyze that area or point in the image to detect an object at that area or point, and select that object.

The processor 106 may be further configured to receive, via a user interface, a user input indicative of a selection of the first light source 110 and/or the second light source 112 in the image 120. This may be beneficial if the image 120 comprises more than two light sources (see FIGS. 5a and 5b). The processor 106 may be further configured to indicate to a user, via the image rendering device, which light sources have been detected in the image 120, enabling a user to select a certain light source. Alternatively, the user may select an area or a point in the image 120, whereupon the processor 106 (or the second remote processor) may analyze that area or point in the image 120 to detect a light source at that area or point, and select that light source.

The display in the examples of FIGS. 5a-5c may be a touch-sensitive display configured to receive user input. FIG. 5a shows an image of a space comprising three light sources 110, 112, 114. Two objects 130, 132 have been detected in the image. A user may use the user interface to select a light source 112 that is to be associated with one of the objects.

The processor 106 may be further configured to receive, via a user interface, a user input indicative of a creation of an association between an object and a light source. This enables a user to indicate according to which color a selected light source is to be controlled, simply by selecting the object in the image 120 and the light source. This has been illustrated in FIG. 5b, wherein a user selects object 132 and light source 112 (e.g. by dragging the color of the object 132 onto the light source 112 via the touch-sensitive display, or by selecting the object 132 and the light source 112 simultaneously or subsequently via the touch-sensitive display).

The processor 106 may be further configured to receive a lighting adjustment user input, and adjust the light output of the first light source 110 and/or the second light source 112 based on the lighting adjustment user input. FIG. 5c illustrates an example, wherein a color selector bar is displayed on the touch-sensitive display. A user may, for example, select a light source in the image 120, and subsequently select a color for the selected light source.

It should be understood that the touch-sensitive display of FIGS. 5a-5c is an example of a user interface, and that the skilled person is able to design alternative user interfaces without departing from the scope of the appended claims. The user interface may, for example, be a voice-controlled interface (enabling a user to select objects, select light sources, control light sources, etc. by providing voice input), a gesture-controlled user interface (enabling a user to select objects, select light sources, control light sources, etc. by providing gesture input), etc.

Figure 6A:
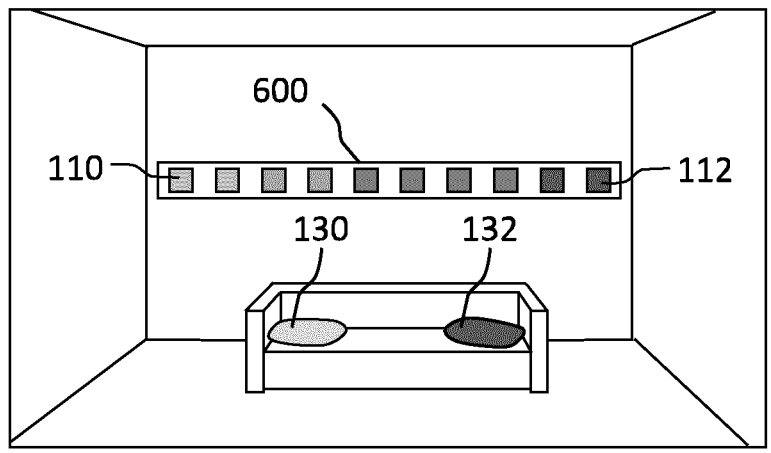
FIGS. 6a and 6b show schematically captured images of two objects and a luminaire comprising a plurality of light sources.
Figure 6B:
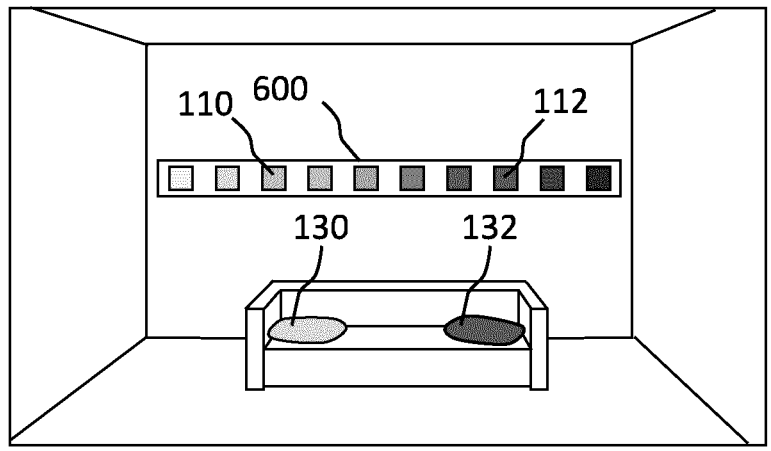

FIG. 6a illustrates a captured image of two objects 130, 132 and a luminaire 600 comprising a plurality of light sources, including the first and second light source 110, 112. The luminaire 600 comprises the first light source 110 and the second light source 112. In this example, the luminaire is an LED strip comprising the plurality of light sources. The processor 106 may be configured to determine colors for the light sources 110, 112 located at the ends of the LED strip based on the colors of the objects 130, 132, and interpolate between these colors to determine colors for the light sources in between the first and second light sources 110, 112. In FIG. 6b, the first and second light sources 110, 112 are selected such that they are closest to the objects 130, 132. The processor 106 may be configured to determine colors for the light sources between the first and second light sources 110, 112 by interpolating between the colors of the objects 130, 132, and to determine colors for the light sources outside the first and second light sources 110, 112 by extrapolating between the colors of the objects 130, 132.

Figure 6C:
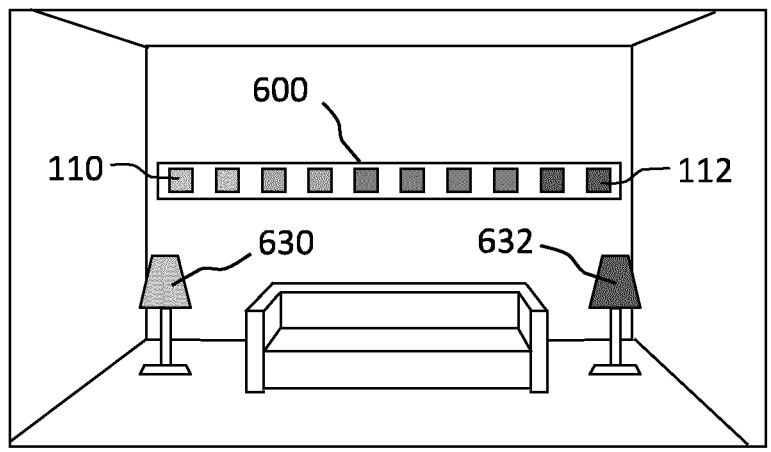
FIG. 6c shows schematically a captured image of two lighting devices and a luminaire comprising a plurality of light sources.

In the previous examples, the objects 130, 132 are pillows on a couch. It should be understood that the objects may be any type of objects (e.g. pieces of art, furniture, toys, devices, plants, decorative objects, etc.) or a mix of different types of objects. In embodiments, the objects 130, 132 may be lighting devices. FIG. 6c illustrates a captured image wherein the objects are lighting devices 630, 632. The image further comprises a luminaire 600 comprising a plurality of light sources, including the first and second light source 110, 112. The processor 106 may receive the current light settings of the lighting devices 630, 632 (e.g. directly from the lighting devices 630, 632, or from another source such as a lighting control system). The light settings may be indicative of the colors of the lighting devices 630, 632. Additionally or alternatively, the processor 106 may extract the colors of the (light emitted by the) lighting devices 630, 632 from the image. The processor 106 may control the plurality of light sources (including the first and the second light sources 110, 112) of the luminaire 600 according to the colors of the lighting devices 630, 632 in a similar way as discussed above.

Figure 7:
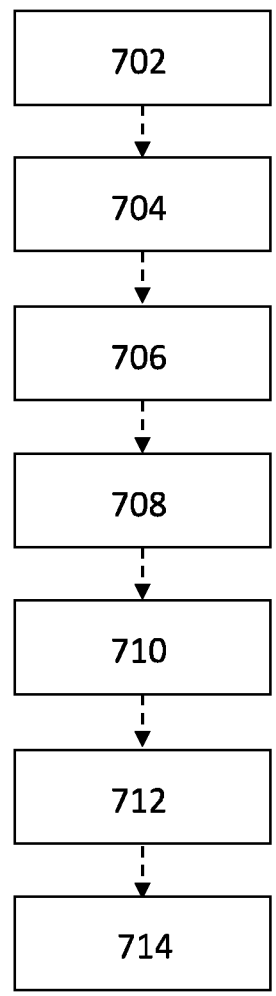
FIG. 7 shows schematically a method of controlling at least two light sources.

FIG. 7 shows schematically a method 700 of controlling at least two light sources 110, 112. The method 700 comprises the steps of obtaining 702 an image captured with a camera, wherein the image comprises at the least two light sources and at least two objects, analyzing 704 the image to detect the at least two light sources and the at least two objects in the image, identifying 706 the at least two light sources, determining 708 positions of the at least two objects relative to the at least two light sources in the image, associating 710 a first object of the at least two objects with a first light source of the at least two light sources and a second object of the at least two objects with a second light source of the at least two light sources based on the determined relative positions, extracting 712 a first color of the first object and a second color of the second object from the image, and controlling 714 the first light source according to the first color and the second light source according to the second color.

The method 700 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the cloud.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling at least two light sources, the method comprising:
    obtaining an image captured with a camera, wherein the image comprises at the least two light sources and at least two objects,
    analyzing the image to detect the at least two light sources and the at least two objects in the image,
    identifying the at least two light sources,
    determining positions of the at least two objects relative to the at least two light sources in the image,
    obtaining color information of colors of the at least two objects,
    determining a first color for a first light source of the at least two light sources and a second color for a second light source of the at least two light sources based on the color information and based on the determined relative positions, and controlling the first light source according to the first color and the second light source according to the second color, wherein the image comprises a third light source, and wherein the method further comprises:

determining a third color for the third light source based on the first color and/or the second color, and controlling the third light source according to the third color.

2. The method of claim 1, wherein the third color is determined based on a position of the third light source in the image relative to positions of the first and second light sources in the image.

3. The method of claim 2, wherein the third color is dependent on a difference between a first distance between the third light source and the first light source and a second distance between the third light source and the second light source.

4. The method of claim 1, wherein the third color is determined by interpolating between the first and the second color, or by extrapolating the first and the second color.

5. The method of claim 1, wherein the method further comprises:

determining distances between the at least two objects and the at least two light sources in the image, and wherein the step of determining the first color for the first light source and the second color for the second light source is further based on the distances.

6. The method of claim 5, wherein the step of determining the first color for the first light source and the second color for the second light source is executed such that the sum of the distances is minimized.

7. The method of claim 1, wherein the method further comprises:

obtaining information indicative of light rendering properties of the at least two light sources, and wherein the step of determining the first color for the first light source and the second color for the second light source is further based on the light rendering properties of the at least two light sources.

8. The method of claim 1, further comprising:

rendering the image on an image rendering device.

9. The method of claim 1, further comprising:

receiving, via a user interface, a user input indicative of a selection of the first object and/or the second object in the image.

10. The method of claim 1, further comprising the steps of:

receiving a lighting adjustment user input, and adjusting the light output of the first and/or the second light source based on the lighting adjustment user input.

11. A nontransitory computer program product for a computing device, the computer program product comprising computer program code to perform the method of claim 1 when the computer program product is run on a processing unit of the computing device.

12. A controller for controlling at least two light sources, the controller comprising:

a transmitter configured to transmit lighting control commands to the at least two light sources, a receiver configured to receive an image captured with a camera, wherein the image comprises at the least two light sources and at least two objects, a processor configured to analyze the image to detect the at least two light sources and the at least two objects, identify the at least two light sources, determine positions of the at least two objects relative to the at least two light sources in the image, obtain color information related to colors of the at least two objects, determine a first color for a first light source of the at least two light sources and a second color for a second light source of the at least two light sources based on the color information and based on the determined relative positions, and control the first light source according to the first color and the second light source according to the second color via the transmitter, wherein the image comprises a third light source, and wherein the processor is further configured to: determine a third color for the third light source based on the first color and/or the second color, and control third light source according to the third color.

13. The controller of claim 12, further comprising the camera configured to capture the image.

14. The controller of claim 12, further comprising an image rendering device configured to render the image.

* * * * *